United States Patent
Jiang et al.

(10) Patent No.: US 11,199,761 B1
(45) Date of Patent: Dec. 14, 2021

(54) OPTICAL PROJECTION SYSTEM WITH MICROLENS ARRAYS

(71) Applicant: YEJIA OPTICAL TECHNOLOGY (GUANGDONG) CORPORATION, Dongguan (CN)

(72) Inventors: Cheng Jiang, Dongguan (CN); Jun She, Dongguan (CN); Jixue Nan, Dongguan (CN)

(73) Assignee: YEJIA OPTICAL TECHNOLOGY (GUANGDONG) CORPORATION, Dongguan (CN)

(*) Notice: Subject to any disclaimer, the term of this patent is extended or adjusted under 35 U.S.C. 154(b) by 0 days.

(21) Appl. No.: 17/237,341

(22) Filed: Apr. 22, 2021

(30) Foreign Application Priority Data

Aug. 12, 2020 (CN) .......................... 202010805929.7

(51) Int. Cl.
*G03B 21/14* (2006.01)
*G03B 21/26* (2006.01)
*G03B 21/20* (2006.01)

(52) U.S. Cl.
CPC ....... *G03B 21/142* (2013.01); *G03B 21/2006* (2013.01); *G03B 21/26* (2013.01)

(58) Field of Classification Search
CPC ...... G03B 21/14; G03B 21/142; G03B 21/26; G03B 21/2066; G03B 21/2013; G03B 21/208

USPC .......................................................... 353/38
See application file for complete search history.

(56) References Cited

U.S. PATENT DOCUMENTS

| | | | |
|---|---|---|---|
| 2014/0198303 A1* | 7/2014 | Wang | G03B 21/204 353/38 |
| 2016/0037142 A1* | 2/2016 | Nakajima | G02B 27/286 353/20 |
| 2019/0041737 A1* | 2/2019 | Yasumatsu | G03B 21/2073 |
| 2021/0088888 A1* | 3/2021 | Nakamura | G02F 1/133512 |

* cited by examiner

*Primary Examiner* — William C. Dowling
(74) *Attorney, Agent, or Firm* — Locke Lord LLP; Tim Tingkang Xia, Esq.

(57) ABSTRACT

The present invention provides an optical projection system with microlens arrays. The optical projection system includes a light source, a collimating lens, a first microlens array, a projection source, a positive lens module, a second microlens array and a receiving surface which are arranged in sequence. The first microlens array includes n first microlens units arranged in an array. The projection source includes n projected image units arranged in an array. The second microlens array includes n second microlens units arranged in an array. The first microlens unit and the second microlens unit which are opposite to each other have a common optical axis. According to the system of the present invention, sub-real image units can be compounded and superposed on the receiving surface, such that optical crosstalk between adjacent optical channels can be avoided.

7 Claims, 7 Drawing Sheets

ОPTICAL PROJECTION SYSTEM WITH MICROLENS ARRAYS

CROSS-REFERENCE TO RELATED PATENT APPLICATION

This application claims priority to Chinese Patent Application No. 202010805929.7 filed in China on Aug. 12, 2020. The disclosure of the above application is incorporated herein in its entirety by reference.

TECHNICAL FIELD

The present invention relates to a projection system, in particular to an optical projection system with microlens arrays.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A projection system is an optical system that illuminates an object and then images it on a projection screen. A short-range projection system may be applied to the side of a car for guesting, or may also be applied to the front or rear of the car as a warning reminder, or may also be applied for desktop projection, such as projection of a keyboard image.

The projection system mainly comprises three important components: a light source, a projection source, and an imaging unit. Based on whether an image in the projection source repeatedly appears on a receiving surface, the projection system is divided into a single-channel projection system and a multi-channel projection system.

As shown in FIG. 1, the single-channel projection system is provided with a multi-piece type imaging unit, which comprises an LED, a collimating lens, a film and other projection sources, and a projection unit lens group, such that high-resolution projected real images can be obtained at different distances, but the depth of field is shallow, the number of lenses is large, and the total length of the system is large.

As shown in FIG. 2, the multi-channel projection system comprises a light source, a collimating lens, a first microlens array, a projection source and a second microlens array, which can realize far-field imaging. However, when a receiving surface is relatively near, the height of a microlens unit is larger than an image height of a projected real image and cannot be ignored. For example, when a ratio of the height of the microlens unit to the height of the projected real image is greater than 1/50, due to the deviation of each imaging optical path, a plurality of staggered real image units will be formed on the receiving surface, resulting in the final inability to form a clear and single projected real image.

In order to solve the above problems, the related art patent No. 201480039253.8 discloses a multi-aperture projection display and a single-image generator for the multi-aperture projection display. In FIG. 2, the center of the second microlens array is biased, so that an optical axis corresponding to the second microlens array does not coincide with an optical axis of the first microlens array, thereby achieving multi-channel image overlap and superposition, and finally achieving short-range projection and a single real image.

However, since the optical axis of the first microlens array and the optical axis of the second microlens array are biased and staggered, that is, part of light in a certain unit of the first microlens array enters an adjacent unit in the second microlens array, optical information between adjacent channels will undergo mutual crosstalk, and finally cause a projected real image to form a ghost.

The projection system in the related art cannot ensure that the projected real image is clear without ghosting when obtaining a short-range projection.

SUMMARY

On this basis, in view of the existing technical problems, it is necessary to provide an optical projection system with microlens arrays, which can ensure that a projected real image is clear without ghosting while achieving short-range projection imaging.

In order to solve the problems existing in the related art, the present invention provides an optical projection system with microlens arrays. The optical projection system comprises a light source, a collimating lens, a first microlens array, a projection source, a positive lens module, a second microlens array and a receiving surface which are arranged in sequence, wherein the first microlens array comprises n first microlens units arranged in an array; the projection source comprises n projected image units arranged in an array; the positive lens module comprises an optical structure surface having positive focal power; the second microlens array comprises n second microlens units arranged in an array;

each projected image unit corresponds to each of the first microlens units and each of the second microlens units on both sides, respectively, and the first microlens unit and the second microlens unit which are opposite to each other have a common optical axis;

and a distance between the projection source and the positive lens module is s; a distance between the second microlens array and the receiving surface is L'; an equivalent focal length of the positive lens module is F=L'; a focal length of the first microlens unit is $f_1 \approx s$; and a focal length of the second microlens unit is $f_2 = s$.

Preferably, the first microlens unit is a plano-convex lens, and a plane of the first microlens unit is closely clung to the projection source.

Preferably, the projection source comprises at least two types of projected image units with different projection images.

Preferably, the optical structure surface having positive focal power in the positive lens module is an aspheric surface or a Fresnel structure surface.

Preferably, the positive lens module comprises an optical structure surface with positive focal power and a plane.

Preferably, the second microlens unit is a plano-convex lens.

Preferably, the positive lens module and the second microlens array are integrally formed as a compound lens, and a plane of the positive lens module is closely clung to the plane of the second microlens array.

The present invention has the following beneficial effects: according to the optical projection system with the microlens arrays, the projection source and the positive lens module are provided between two sets of microlens arrays, such that respective sub-real image units in the plurality of optical channels can be compositely superimposed on the receiving surface by the combination of the magnification of the positive lens and the second microlens array, so as to obtain a clear projected real image. In addition, the centers of the first microlens unit, the projection image unit, and the second microlens unit are coaxial, which can effectively avoid light crosstalk between adjacent optical channels, and can effectively prevent a final projected real image from forming ghost.

BRIEF DESCRIPTION OF THE DRAWINGS

The invention is described in detail below in conjunction with embodiments and drawings.

Figure 1:
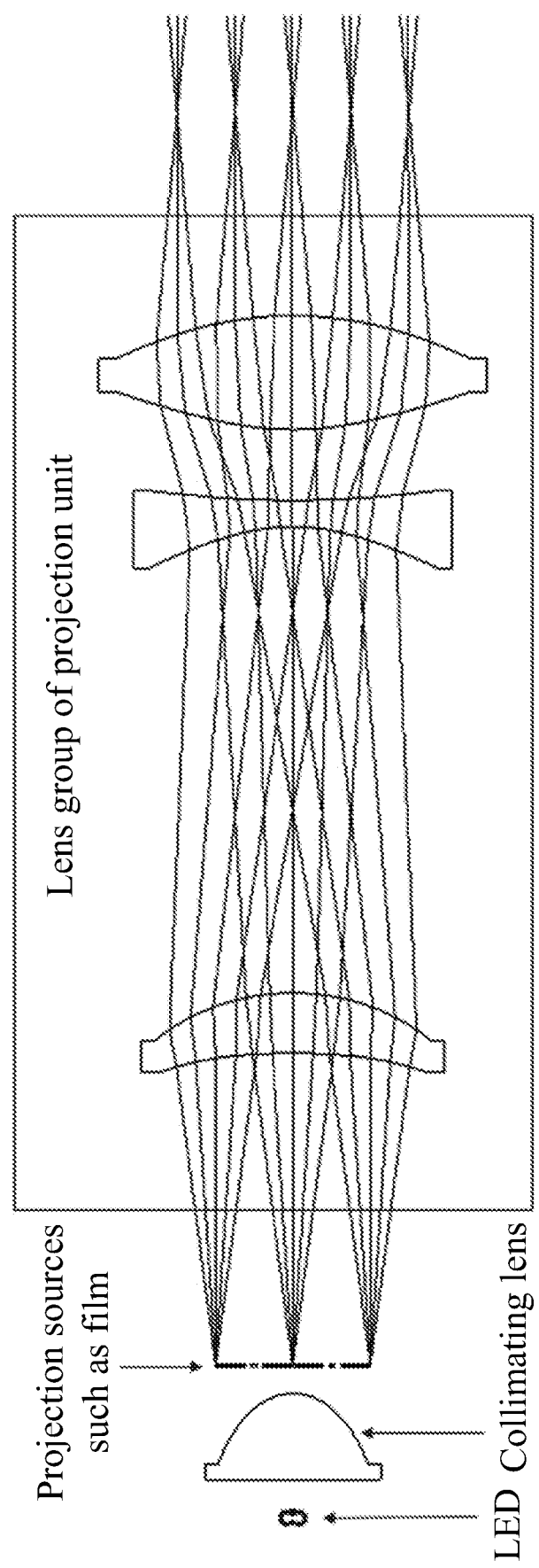
FIG. 1 is a schematic structural diagram of an optical path structure of a single-channel projection system in the related art.
Figure 2:
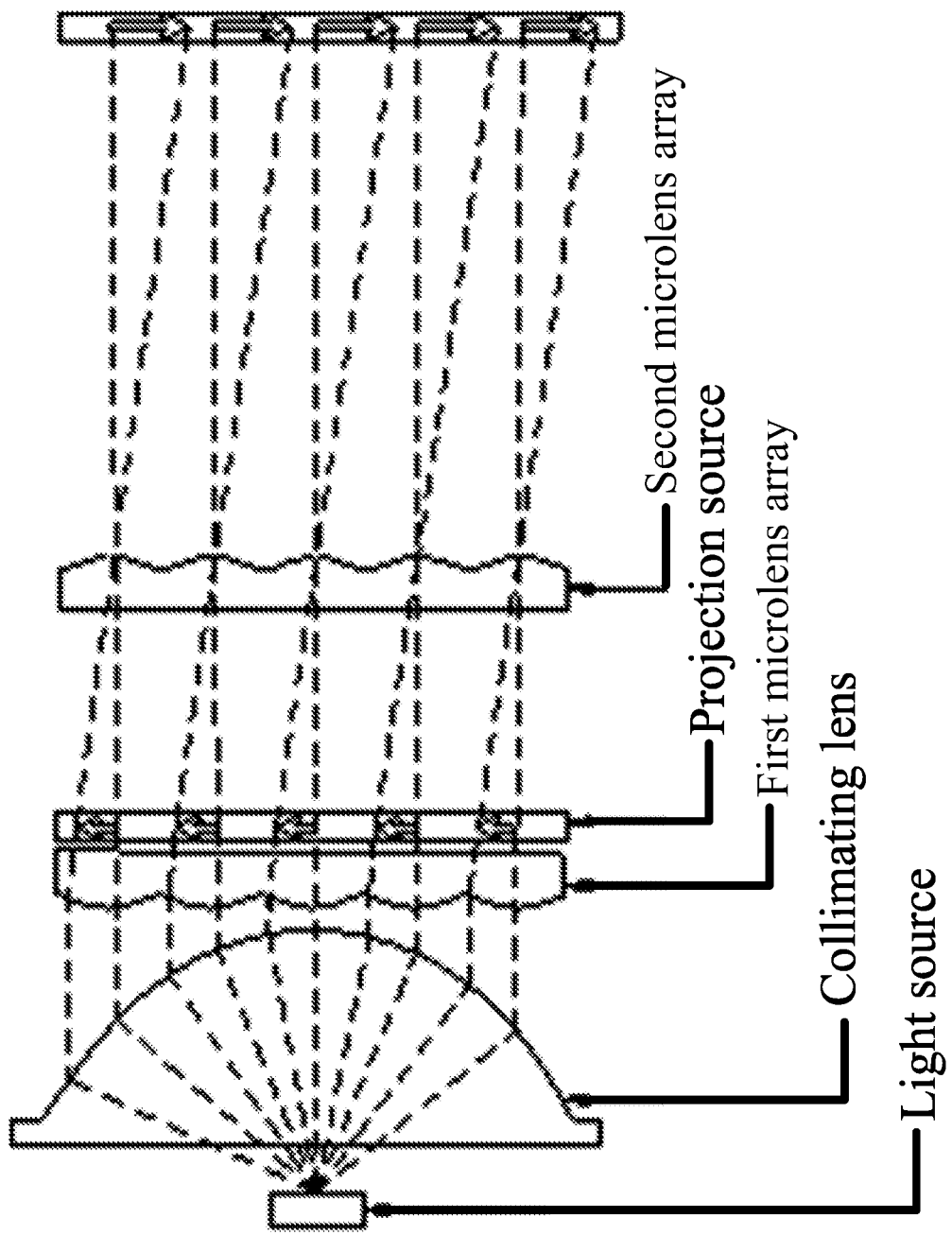
FIG. 2 is a schematic structural diagram of an optical path structure of a multi-channel projection system in the related art.

In the drawings, reference symbols represent the following components: 10—light source; 20—collimating lens; 30—first microlens array; 31—first microlens unit; 40—projection source; 41—projected image unit; 50—positive lens module; 60—second microlens array; 61—second microlens unit; 70—receiving surface; 80—compound lens.

DETAILED DESCRIPTION

In order to further understand the features, technical means, and specific objectives and functions achieved by the present invention, the present invention will be described in further detail below with reference to the accompanying drawings and specific embodiments.

Figure 3:
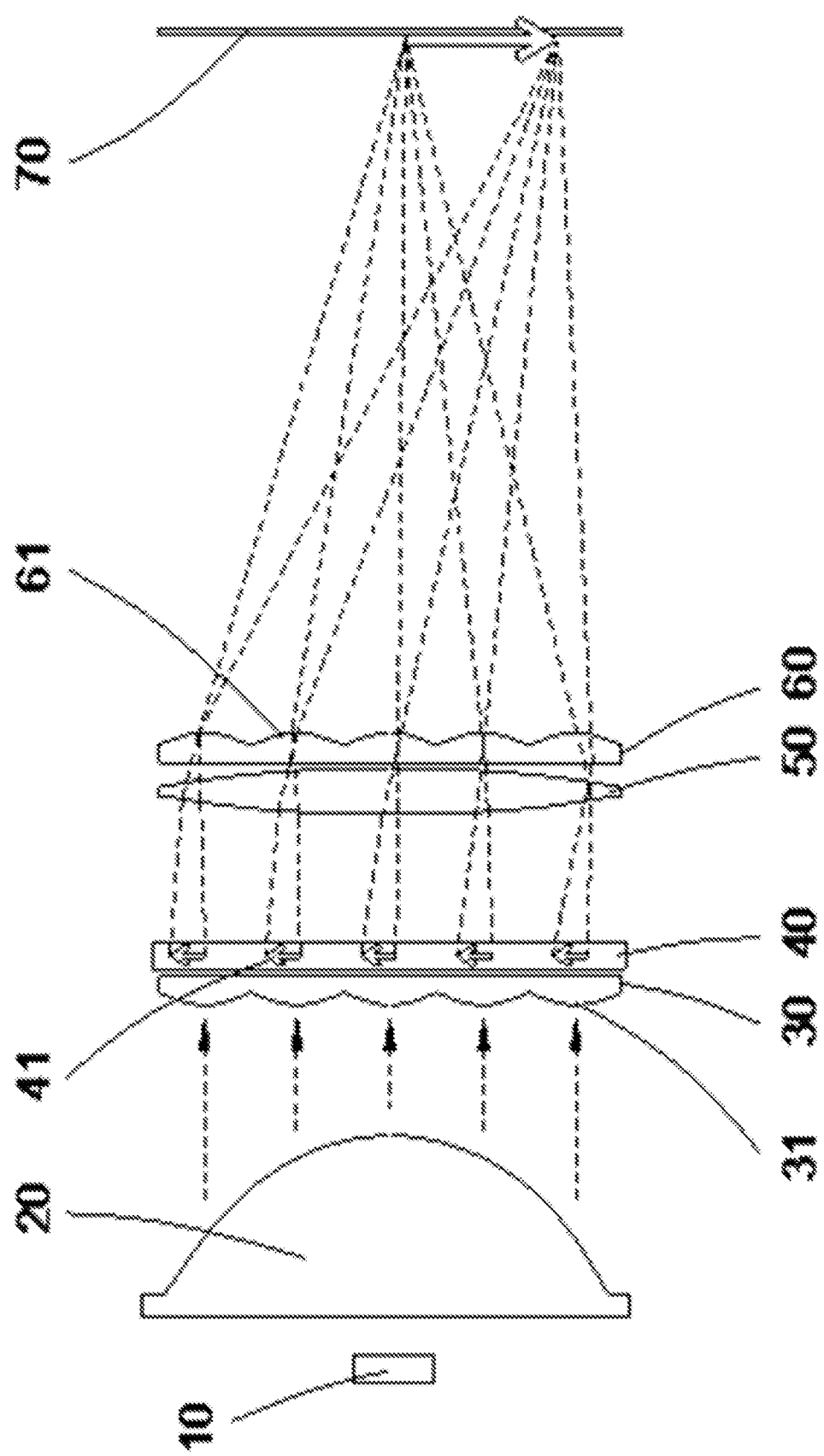
FIG. 3 is a schematic structural diagram of the present invention.

As shown in FIG. 3, a basic embodiment of the present invention discloses an optical projection system with microlens arrays. The optical projection system comprises a light source 10, a collimating lens 20, a first microlens array 30, a projection source 40, a positive lens module 50, a second microlens array 60 and a receiving surface 70 which are arranged in sequence. The light source 10 may be an LED lamp bead. The projection source 40 may be a film, a liquid crystal screen, etc. The positive lens module 50 is located between the projection source 40 and the second microlens array 60. The receiving surface 70 may be a plane structure such as a wall, ground, or a white screen. The microlens array is also referred to as a fly's-eye lens. The first microlens array 30 comprises n first microlens units 31 arranged in an array. The projection source 40 comprises n projected image units 41 arranged in an array. The positive lens module 50 comprises an optical structure surface having positive focal power. The second microlens array 60 comprises n second microlens units 61 arranged in an array.

Each projected image unit 41 corresponds to each of the first microlens units 31 and each of the second microlens units 61 on both sides, respectively, and the first microlens unit 31 and the second microlens unit 61 which are opposite to each other have a common optical axis. An optical channel unit is formed between the first microlens unit 31 and the second microlens unit 61 which are opposite to each other, and each projected image unit 41 is located in each optical channel unit.

Figure 4:
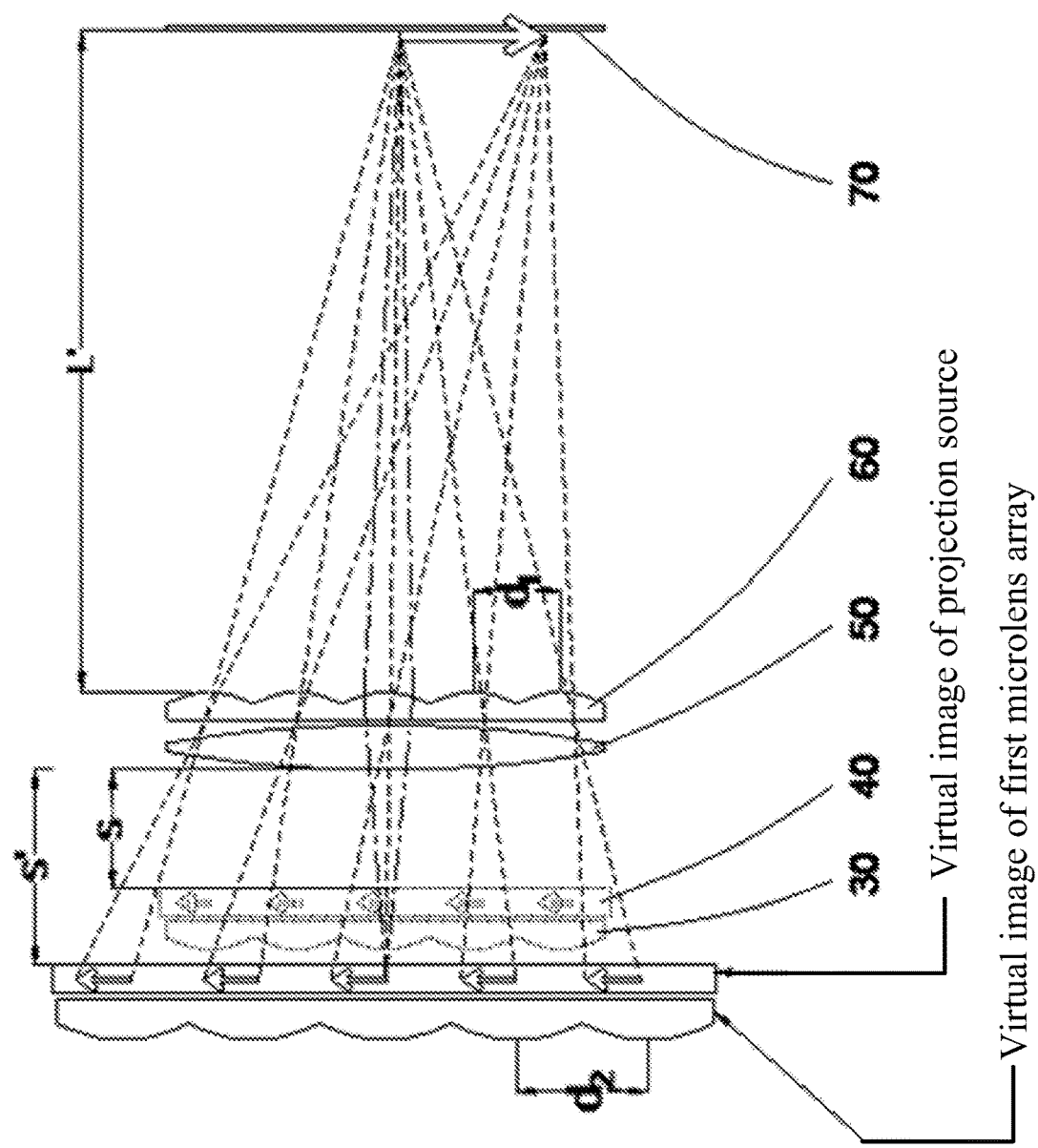
FIG. 4 is a schematic diagram of an imaging principle after a light source and a collimating lens are hidden in the present invention.

The positive lens module 50 can form an upright magnified virtual image against the projection source 40 and the first microlens array 30. As shown in FIG. 4, a distance between the projection source 40 and the positive lens module 50 is s; a distance between the second microlens array 60 and the receiving surface 70 is L'; L' is a projection distance; a distance between the first microlens array 30 and the second microlens array 60 is approximately equal to s, that is, there is almost no difference in the spatial position of the first microlens array 30 and the projection source 40 along the optical axis, and there is also almost no difference in the spatial position of the second microlens array 60 and the positive lens module 50 along the optical axis; a distance between centers of two adjacent first microlens units 31, a distance between centers of two adjacent projected image units 41, and a distance between centers of two adjacent second microlens units 61 are $d_1$, respectively; a distance between centers of virtual images of two adjacent projected image units 41 is $d_2$, that is, a distance between centers of two adjacent sub-objective image units is $d_2$; and a distance between a virtual image of the projection source 40 and the positive lens is s'; $s'=(F*s)/(F-s)$, $d_2=(F*d_1)/(F-s)$ may be derived according to an imaging formula of a thin lens. $(L'+s')/L'=d_2/d_1$ may be derived according to a triangular proportional relationship in FIG. 4. An equivalent focal length of the positive lens module 50 is set as F=L'. Since the first microlens unit 31 functions as a field lens, parallel light from the collimating lens 20 can be focused on the center of the second microlens unit 61. A focal length of the first microarray unit 31 is set as $f_1 \approx s$, taking $f_1=s$, which can ensure that the first microlens unit 31 can focus parallel light to the center of the second microlens unit 61, and can effectively ensure the utilization rate of light energy. The second microlens unit 61 plays the role of projection imaging. $1/L'+1/s'=1/f_2$ may be derived according to an imaging formula of a thin lens. A focal length of the second microlens unit 61 is set as $f_2=s$. The values F, $f_1$, and $f_2$ calculated by the above relational expression is an ideal value and, in specific applications, can be adjusted based on the ideal value according to actual situations so as to adapt to the corresponding demands.

During operation, light emitted from the light source 10 reaches the collimating lens 20, the first microlens array 30, the projection source 40, the positive lens module 50, the second microlens array 60 and the receiving surface 70 in sequence. The positive lens module 50 can form an upright magnified virtual image against the projection source 40 and the first microlens array 30. As shown in FIG. 4, the optical axis of the second microlens unit 61 and the virtual image optical axis of the first microlens unit 31 are not collinear, and the optical axis of the second microlens unit 61 and the virtual image optical axis of the projection image unit 41 are also not collinear. A virtual image of the projected pattern unit is a sub-objective image unit. After respective sub-objective image units are subjected to a projection effect of the second microlens array 60, and the resulting sub-real image units can be superimposed and compounded on the receiving surface 70 to finally obtain a clear projected real image.

From a mathematical point of view, the combination of the positive lens module 50 and the second microlens array 60 is actually an optical adder. The illuminance distribution of the receiving surface 70 satisfies the following relationship: $E(x, y)=\Sigma_{i=1...n} E_i (x_i, y_i)$, wherein (x, y) are position coordinates of the receiving surface 70; E is the illuminance of the receiving surface 70; $(x_i, y_j)$ is position coordinates of the projection source 40; and $E_i$ is the illuminance of the projection source 40.

In this embodiment, the first microlens unit 31 is a miniature plano-convex lens, and the plane of the first microlens unit 31 is closely clung to the projection source 40, which can effectively improve the utilization rate of light energy and can effectively reduce the loss of light energy. The first microlens unit 31 can also be a biconvex lens or a meniscus lens, or even a combination of multiple microlenses.

Figure 5:
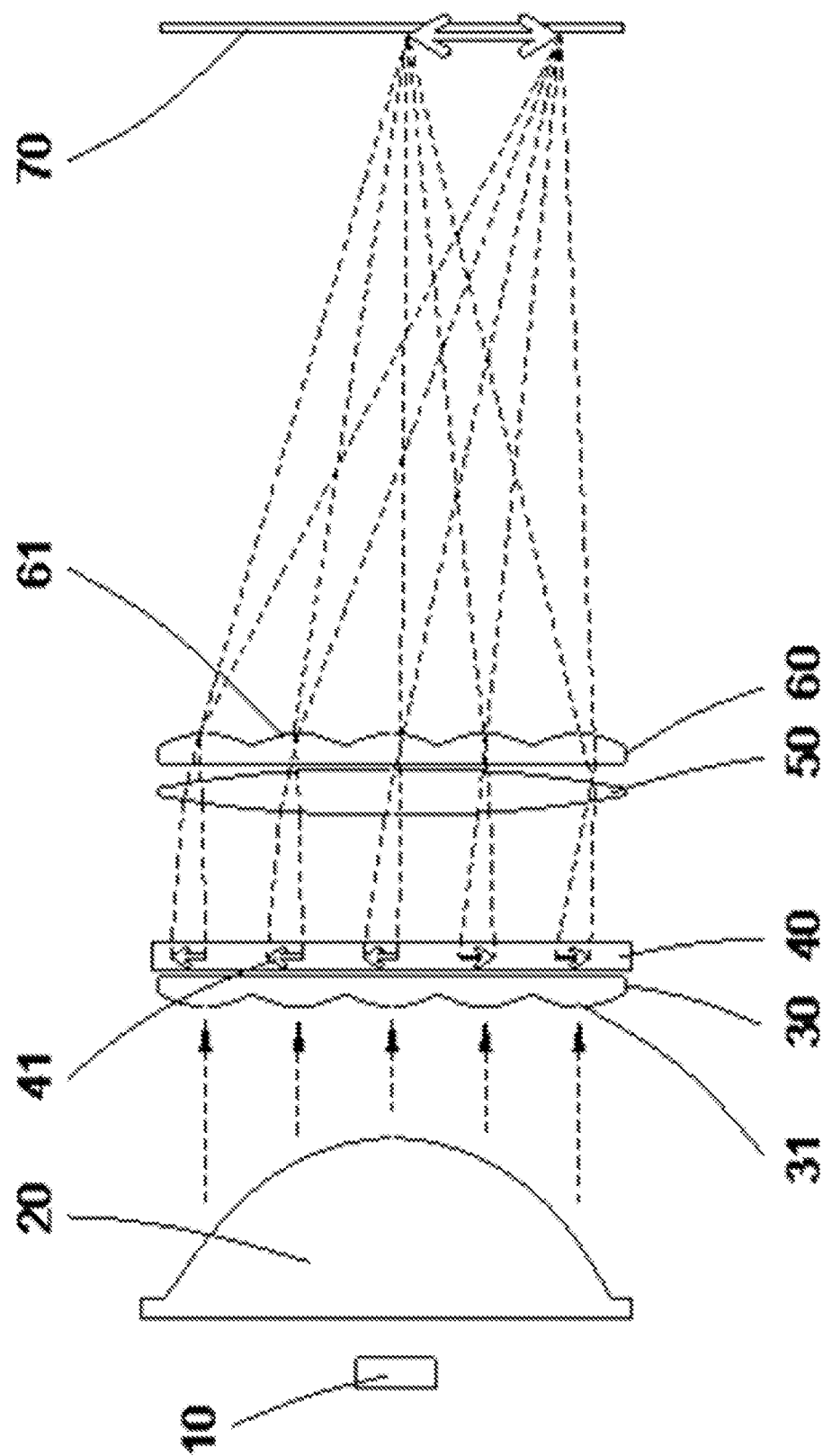
FIG. 5 is a schematic structural diagram of an embodiment of the present invention.

In this embodiment, the projection source 40 comprises at least two types of projected image units 41 with different projection images, that is, at least two types of projected image units 41 are provided. As shown in FIG. 5, the projected images of different types of projected image units 41 are different, and various sub-real image units with different formed images are compositely superimposed on the receiving surface 70, thereby forming an image-specific projected real image.

In this embodiment, the optical structural surface having positive focal power in the positive lens module 50 is an aspheric surface having positive focal power or a Fresnel structural surface having positive focal power. The Fresnel structure surface is composed of a number of concentric Fresnel convex rings, the aspheric surface has good imaging quality, and the Fresnel structure surface can reduce the thickness of the positive lens module 50.

Figure 6:
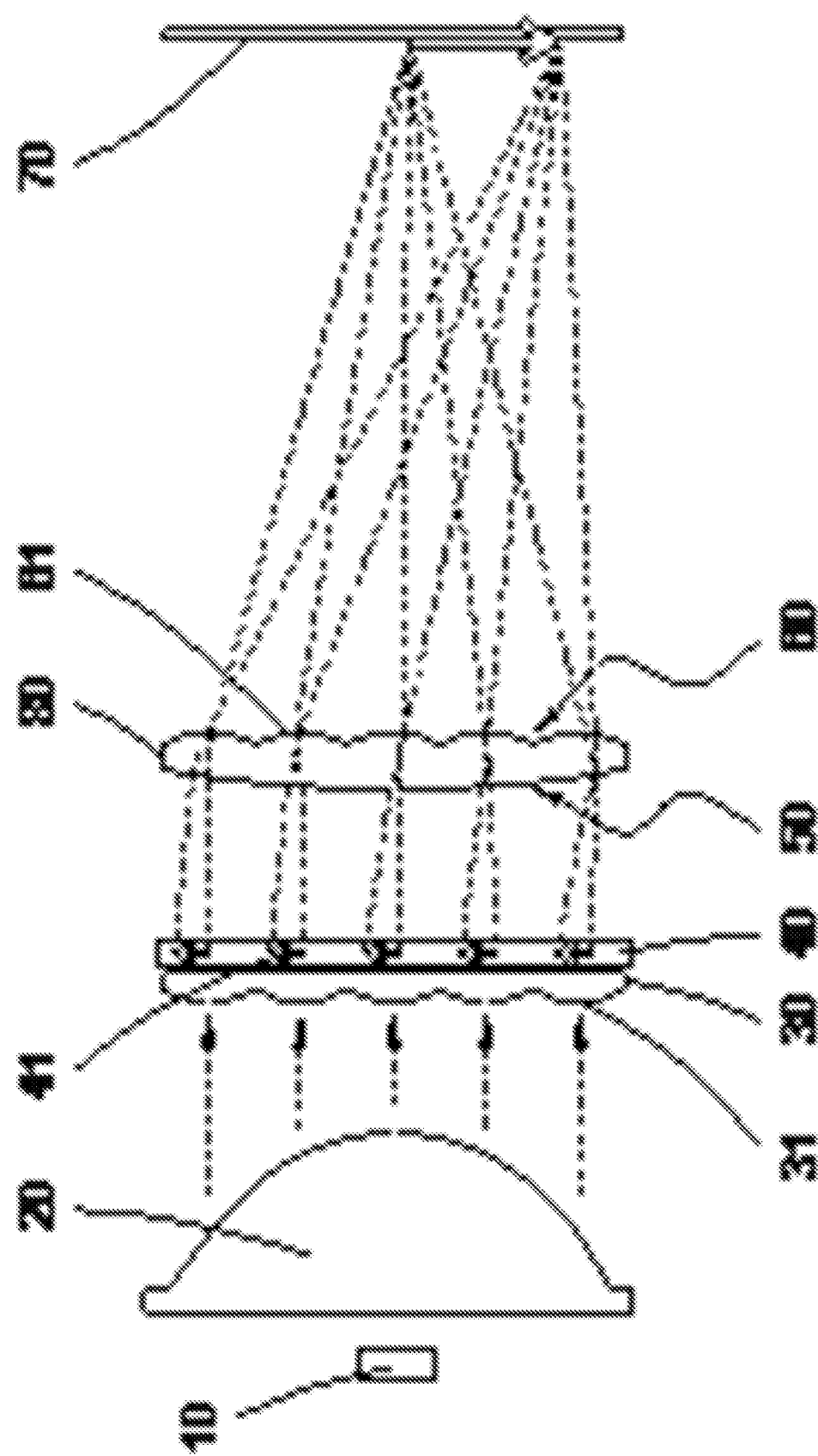
FIG. 6 is a schematic structural diagram of another embodiment of the present invention.
Figure 7:
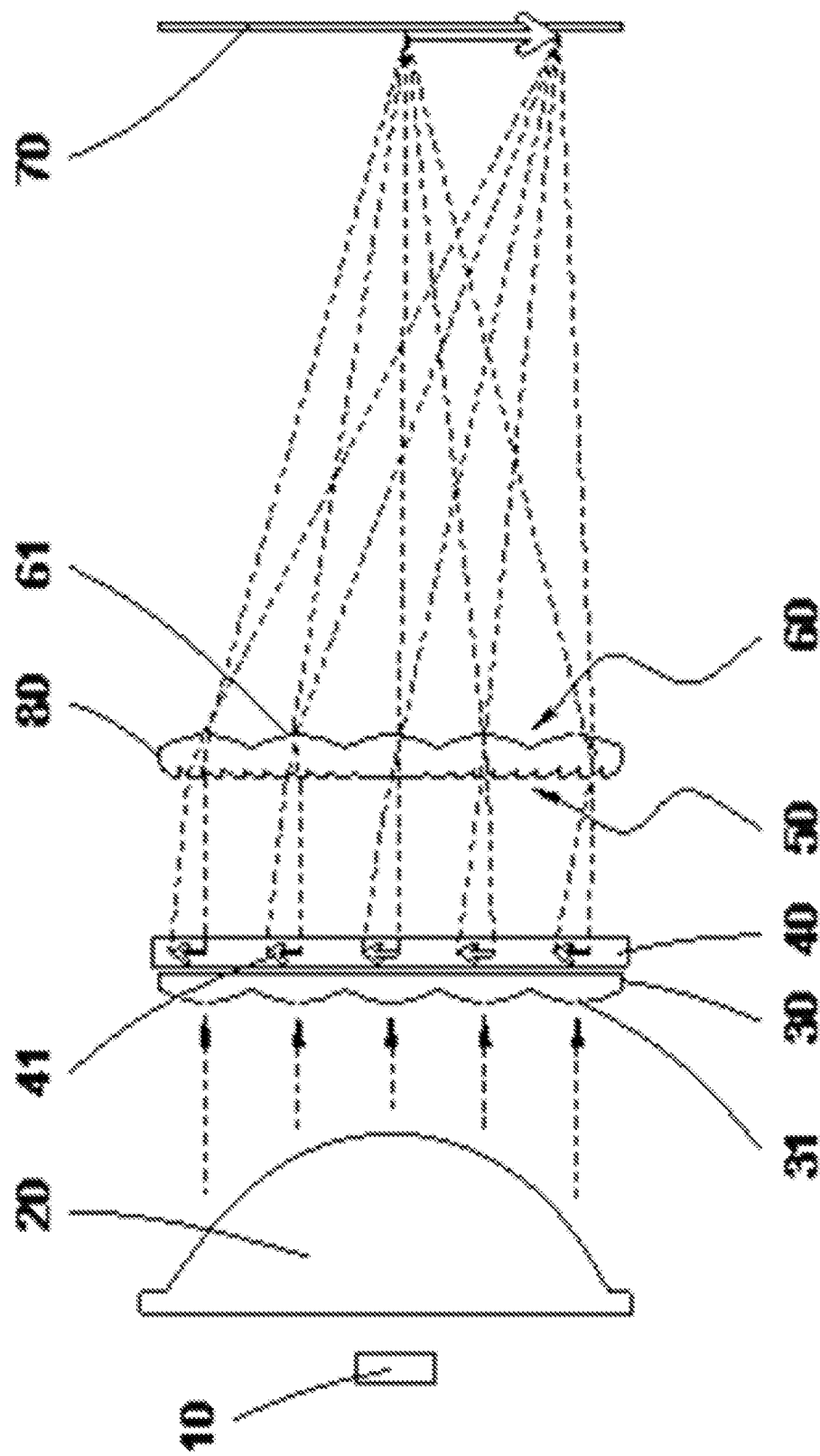
FIG. 7 is a schematic structural diagram of yet another embodiment of the present invention.

Based on the above embodiment, the positive lens module 50 comprises an optical structure surface having positive focal power and a plane, that is, the positive lens module 50 is a plano-convex lens or a plano-convex Fresnel lens. The second microlens unit 61 is a miniature plano-convex lens. The positive lens module 50 and the second microlens array 60 are integrally formed as a compound lens 80, and the plane of the positive lens module 50 is closely clung to the plane of the second microlens array 60. The compound lens 80 has an integrally formed lens structure. As shown in FIG. 6, one side of the compound lens 80 close to the projection source 40 has an aspheric structure, and the other side of the compound lens 80 has a second microlens array 60 structure. As shown in FIG. 7, one side of the compound lens 80 close to the projection source 40 has a Fresnel lens structure, and the other side of the compound lens 80 has a second microlens array 60 structure. An integrated compound lens 80 is obtained by compounding the positive lens module 50 and the second microlens array 60, which can effectively reduce the number of optical components of the system, thereby effectively reducing the loss of light energy caused by the optical components, effectively improving the utilization rate of light energy of the system, reducing the system cost and reducing the difficulty of assembly.

The positive lens module 50 may also be a biconvex lens or a meniscus lens, or a multi-piece type lens group having positive focal power. The second microlens unit 61 may also be a biconvex lens or a meniscus lens, or even a combination of multiple microlenses.

The above-mentioned embodiments only express several implementations of the present invention, and the description is relatively specific and detailed, but it should not be understood as a limitation to the patent scope of the present invention. It should be pointed out that for those of ordinary skill in the art, without departing from the concept of the present invention, several modifications and improvements can be made, and these all fall within the protection scope of the present invention.

What is claimed is:

1. An optical projection system with microlens arrays, comprising:
   a light source (10), a collimating lens (20), a first microlens array (30), a projection source (40), a positive lens module (50), a second microlens array (60) and a receiving surface (70) which are arranged in sequence, wherein
   the first microlens array (30) comprises n first microlens units (31) arranged in an array; the projection source (40) comprises n projected image units (41) arranged in an array; the positive lens module (50) comprises an optical structural surface having positive focal power; the second microlens array (60) comprises n second microlens units (61) arranged in an array;
   each projected image unit (41) corresponds to each of the first microlens units (31) and each of the second microlens units (61) on both sides, and the first microlens unit (31) and the second microlens unit (61) which are opposite to each other have a common optical axis;
   a distance between the projection source (40) and the positive lens module (50) is s; a distance between the second microlens array (60) and the receiving surface (70) is L'; a distance between the first microlens array (30) and the second microlens array (60) is approximately equal to s; an equivalent focal length of the positive lens module (50) is F=L'; a focal length of the first microlens unit (31) is $f_1 \approx s$; and a focal length of the second microlens unit (61) is $f_2 = s$.

2. The optical projection system according to claim 1, wherein the first microlens unit (31) is a plano-convex lens, and a plane of the first microlens unit (31) is closely clung to the projection source (40).

3. The optical projection system according to claim 1, wherein the projection source (40) comprises at least two types of projected image units (41) with different projection images.

4. The optical projection system according to claim 1, wherein the optical structure surface having positive focal power in the positive lens module (50) is an aspheric surface or a Fresnel structure surface.

5. The optical projection system according to claim 4, wherein the positive lens module (50) comprises an optical structure surface with positive focal power and a plane.

6. The optical projection system according to claim 5, wherein the second microlens unit (61) is a plano-convex lens.

7. The optical projection system according to claim 6, wherein the positive lens module (50) and the second microlens array (60) are integrally formed as a compound lens (80), and the plane of the positive lens module (50) is closely clung to the plane of the second microlens array (60).

\* \* \* \* \*